United States Patent Office 3,320,005
Patented May 16, 1967

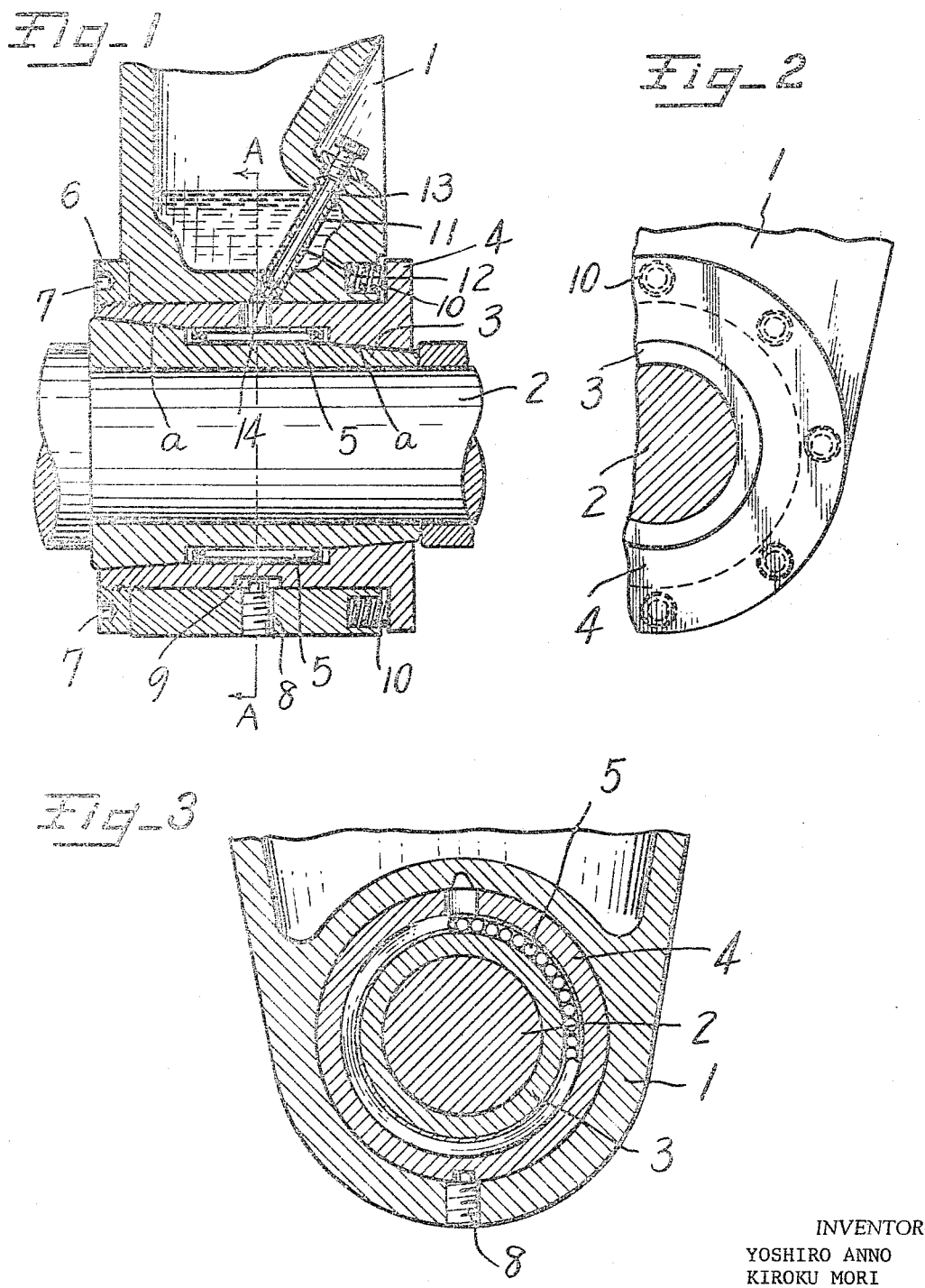

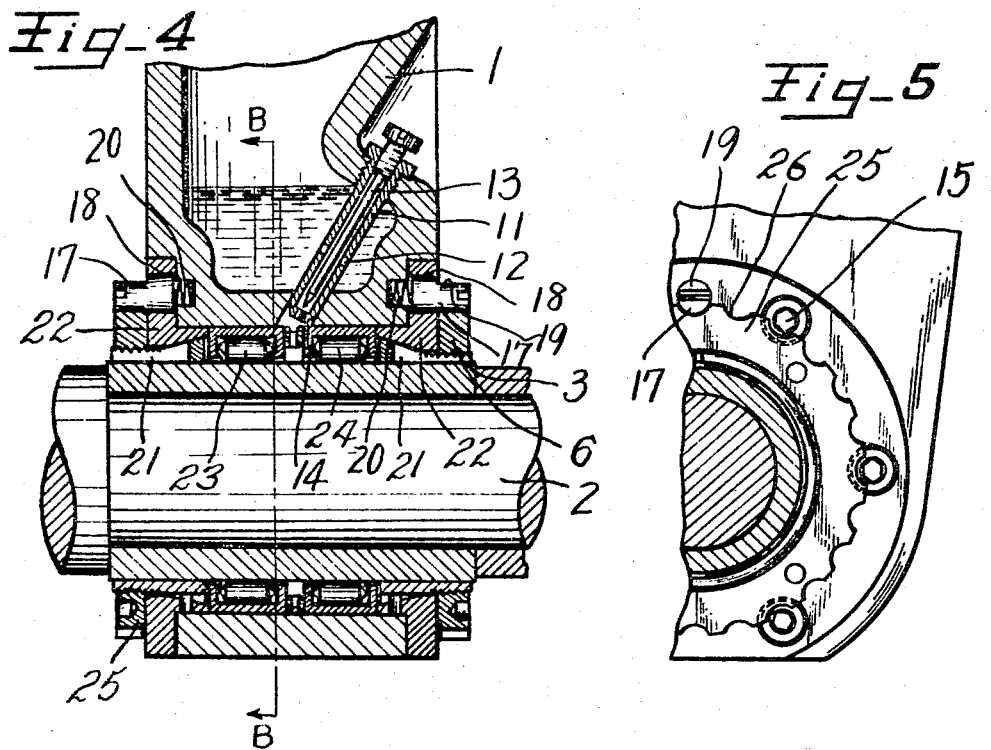
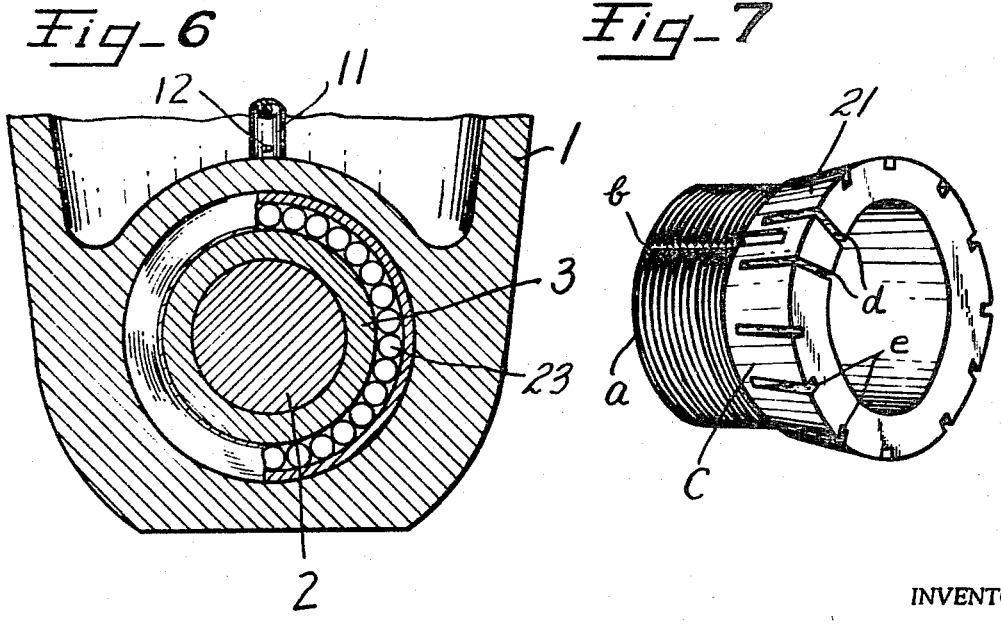

3,320,005
ADJUSTING DEVICE FOR ARBOR SUPPORTING BEARING FOR HORIZONTAL MILLING MACHINES
Yoshiro Anno, Ota-ku, Tokyo, and Kiroku Mori, Kawasaki, Japan, assignors to Hitachi Limited, Chiyoda-ku, Tokyo, Japan, a corporation of Japan
Filed Sept. 30, 1963, Ser. No. 312,476
2 Claims. (Cl. 308—35)

The present invention relates to an adjusting device for arbor supporting bearing for horizontal milling machines. In conventional horizontal milling machines the outer diameter and length of the arbor are determined by the inner diameter of the smallest cutter. Since the cutter diameter is usually small such as 25 to 40 mm., and the length is long, and the ratio of rotation between the lowest and the highest rotational speeds may be of the order of 1 to 100, it has been found that bending distortion and vibration occur during cutting operation, thereby causing overheating and seizure of the bush and arbor and lowering the cutting accuracy.

The principal object of the invention is to provide an improved arbor spindle including a needle bearing to overcome the above recited disadvantages caused by a conventional arbor supporting bearing for horizontal milling machines.

According to the invention to attain the object the gap between the needle bearing and the collar secured to the arbor is made comparatively large so as to be suitable for the cutting at a high speed revolution with a lighter load, while it is made smaller in case of a low speed cutting with a heavier load in order not to cause overheating, seizure, twist and bending.

For a better understanding of the invention, reference is taken to the accompanying drawings, in which, FIG. 1 is a vertical sectional view of the adjusting device of the arbor supporting bearing for horizontal milling machine according to the invention;

FIG. 2 is its partial side view;

FIG. 3 is a sectional side view taken on the line A—A of FIG. 1;

FIG. 4 is a sectional elevation of another embodiment of the invention;

FIG. 5 is its partial side view;

FIG. 6 is a cross-sectional view taken along the line B—B of FIG. 4; and

FIG. 7 is a perspective view of the adjusting sleeve.

Referring to FIGS. 1 to 3, there is shown the pertinent portion of a milling machine including a portion 1 of the frame for supporting an arbor 2, a bearing collar 3 fixed to the arbor, and a bearing sleeve 4 fitted to the arbor support 1. A needle bearing 5 is provided to rotatably support the bearing collar 3 fitted in the sleeve 4.

The outer surface of the bearing collar 3 is tapered as shown by $a$ in FIG. 1 and its middle part is finished cylindrically to coact with needle roller bearings 5. The inner surface of the sleeve 4 is tapered similarly to the outer surface of the bearing collar.

Thus, the contact surface between the sleeve 4 and collar 3 is conical. The sleeve 4 is screwed by an adjusting and clamping nut 6 at the tapered end and the sleeve can be adjusted by turning nut 6 by a suitable hand tool (not shown) engaging in the holes 7 to shift the sleeve axially along the tapered contact surface $a$ and then the sleeve 4 can be secured at the adjusted position. A number of springs 10 are arranged between the arbor support and the flange of the sleeve 4 to assist axial resetting of the latter when the nut 6 is unscrewed. A lubricant feed-ind sleeve 11 is fitted to the arbor support having holes 12 for receiving lubricant and a spindle 13 for adjusting the opening 14 to feed the lubricant to the needle bearing 5.

For high speed operation, the nut 6 is backed off and the arbor is rotated on the needle bearing 5. The clearance between the inner and outer races of the needle bearing is designed for high rotational speeds and light loads. With backing off of nut 6, the sleeve 4 is moved axially and parallel with the arbor 2 and the clearance between the bearing surface $a$ between the sleeve 4 and the bearing collar 3 is increased. However, the parallel motion of the flat inner and outer races of the needle bearing maintain the same clearance and rotation is supported by the needle bearing. For low speed operation, nut 6 is tightened to slidably move the sleeve 4 axially in parallel relationship with the arbor 2 to close the gap between the sleeve and the bearing collar along the bearing surface $a$. As the gap is decreased, the lubricant film therein becomes increasingly smaller and although the clearance between the inner and outer races of the needle bearing does not change, the load on the needle bearing is taken up by the sleeve 4 as the gap along the conical surface $a$ is decreased. Thus, excessive loading of the needle bearing at low rotational speeds is avoided. That is, the clearance gap along the conical surface $a$ will become much smaller than the clearance between the inner and outer races of the needle bearing which remains constant and radial loading of the needle bearing which would result in overheating and damage thereto is prevented.

In the embodiment of the invention shown in FIGS. 4 to 7, the adjusting means consists of two elements of cooperating tapered sleeves 21 and 22. Two needle bearings 23, 24 are provided. Each sleeve 22 is secured to the arbor support 1 by means of bolts 15 and the wedge shaped adjusting sleeve 4 is fitted on the bearing collar 3 and is secured by a nut 25 which has a number of curved notches 26 along the periphery to engage stud 17. The stud 17 fits in a hole provided for the flange of the sleeve 22 and has a tapered top 18 to secure the stud in place. About one-half of its top portion 19 is cut off so that if the stud 17 is turned for 180° then the stud disengages the notches 26 so that the nut 25 can be turned to adjust the cooperating sleeve 21 to a required amount and after completed the adjustment stud 17 is turned back to engage the notch 26 to prevent the turning of the nut 6. The stud 17 is normally biased to the tapered hole of the sleeve 21 by a spring 20. When the nut 25 is turned the tapered sleeve 21 slides on the bearing collar 3 axially to the right or left according to the direction of turning of the nut to more tightly or loosely hold the bearing collar 3 according to the request of the operation of the horizontal milling machine which is necessary when the machine is to work on a heavy load at a low speed or on a lighter load at a high speed.

The adjustable tapered sleeve 21 is shown in FIG. 7 more in detail. It consists of a cylindrical threaded portion $a$ which is split at a portion $b$ and a truncated conical portion $c$. In order to make the sleeve 21 resilient and deformable the conical part $c$ is split at several portions $d$ and $e$, so that when it is screwed by means of the nut 25 it can deform to tightly or slackly engage the bearing collar 3 in order to attain the object of the invention.

The sleeve 21 is preferably made of strong and hard, but resilient material such as high lead bronze, and the clearance between the contact surface of the sleeve 21 and bearing collar 3 is previously made sufficiently large so as to be suitable for high speed running of the arbor at light cutting load. When the nut 25 is turned to move the sleeve 21 inwardly, for example, the clearance between the tapered surface $a$ will be increased and become larger than the clearance between the needle bearing 23, 24 and bearing collar 3 so that the sleeve 21 will become free from the outside contact with the bearing collar 3. On the other hand, if the nut 25 is turned to the opposite direction as before to shift the sleeves 21 to the outside the effect is contrary as before, and the clearance between the tapered contact surface *a* becomes smaller to more firmly hold the bearing collar with higher pressure than the contact pressure with the needle bearing and the lubricating oil is fed to the needle bearing and the contact surface *a* during the above operation.

As apparent from the foregoing description, the invention enables adjustment of the clearance between the contact surface of the sleeve and bearing collar as desired so that when the arbor is driven at a higher cutting speed the bearing collar is held by the needle bearing while lubricated, but in case of low speed running of the arbor the bearing collar is supported more tightly by the sleeve so that the overheating and damage of the needle bearing and working parts can be safely prevented.

What we claim is:

1. A bearing assembly for a milling machine which comprises a frame member having a substantially cylindrical aperture therethrough, an arbor extending through said aperture, a bearing collar secured to said arbor, said bearing collar being provided with a tapered surface having a portion at substantially the midpoint thereof which is coaxial with the arbor axis, a needle bearing, said needle bearing being positioned over said portion with said portion constituting the inner race for said needle bearing, a sleeve bushing positioned within said cylindrical aperture of said frame, said sleeve bushing being provided with a tapered surface matching the tapered surface of said bearing collar and being provided with a matching mid-section coaxial with said arbor axis to receive the outer race of said needle bearing, and means for adjusting the axial position of said sleeve bushing within said arbor thereby to vary the clearance between the tapered surface of said bearing collar and the tapered surface of said sleeve bushing at positions astraddle said needle bearing so that at high speeds the arbor rotates supported by said needle bearing and at low speeds, said sleeve bushing is moved into supporting engagement with said bearing collar at positions astraddle said needle bearing.

2. A bearing assembly for a milling machine which comprises a frame member having a substantially cylindrical aperture therethrough, an arbor extending through said aperture, a bearing collar secured to said arbor, said bearing collar comprising a substantially cylindrical collar coaxial with the axis of said arbor, first and second needle bearings positioned on said bearing collar and axially separated from one another, each of said needle bearings having outer races received within said substantially cylindrical aperture in said frame member, a sleeve bushing provided at each end of said arbor, said sleeve bushing being provided with a tapered surface, a mating tapered surface being provided and secured to each end of said arbor, and means at each end of said arbor for moving said sleeve bushings outwardly whereby coaction of the tapered surface thereon with the mating tapered surface will close the clearance between said sleeve bushings and said bearing collar on each side of said needle bearings.

References Cited by the Examiner

UNITED STATES PATENTS

| | | | |
|---|---|---|---|
| 1,279,268 | 9/1918 | Coldwell | 308—189.1 |
| 1,619,995 | 3/1927 | Turner et al. | 308—35 |
| 1,961,134 | 6/1934 | Buckwalter | 308—35 X |
| 2,182,012 | 12/1939 | Bunnell | 308—35 |
| 2,665,954 | 1/1954 | Sherrill | 308—35 |

MARTIN P. SCHWADRON, *Primary Examiner.*

DAVID J. WILLIAMOWSKY, *Examiner.*

N. ABRAMS, R. F. HESS, *Assistant Examiners.*